(12) United States Patent
Kadri et al.

(10) Patent No.: US 8,564,946 B2
(45) Date of Patent: Oct. 22, 2013

(54) COMPUTER INCLUDING HOT-PLUGGABLE DISK STORAGE DRIVES THAT ARE MOUNTED IN AN IN-LINE ARRANGEMENT

(75) Inventors: Rachid M. Kadri, Houston, TX (US); John R. Grady, Cypress, TX (US); David S. Blocker, Conroe, TX (US); Wanda L. Bloomfield, Magnolia, TX (US); George D. Megason, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 160 days.

(21) Appl. No.: 13/139,342

(22) PCT Filed: Jan. 8, 2009

(86) PCT No.: PCT/US2009/030393
§ 371 (c)(1),
(2), (4) Date: Jun. 13, 2011

(87) PCT Pub. No.: WO2010/080150
PCT Pub. Date: Jul. 15, 2010

(65) Prior Publication Data
US 2011/0249392 A1    Oct. 13, 2011

(51) Int. Cl.
*G06F 1/16* (2006.01)
*H05K 13/00* (2006.01)

(52) U.S. Cl.
USPC .............. 361/679.37; 361/679.33; 29/592.1

(58) Field of Classification Search
CPC ................................. G06F 1/16; H05K 13/00
USPC .............. 361/679.37, 679.33; 29/592.1
See application file for complete search history.

(56) References Cited

U.S. PATENT DOCUMENTS

| | | | |
|---|---|---|---|
| 6,404,642 B1 * | 6/2002 | Greenfield et al. | 361/727 |
| 6,762,932 B2 | 7/2004 | Regimbal | |
| 6,879,484 B2 * | 4/2005 | Chou | 361/679.02 |
| 7,362,565 B2 * | 4/2008 | Imblum | 361/679.33 |
| 7,420,805 B2 * | 9/2008 | Smith et al. | 361/679.48 |
| 7,774,804 B2 * | 8/2010 | Onuma et al. | 720/653 |
| 2002/0122295 A1 * | 9/2002 | Laing | 361/685 |
| 2002/0181197 A1 | 12/2002 | Huang | |
| 2006/0061955 A1 | 3/2006 | Imblum | |
| 2006/0294530 A1 * | 12/2006 | Mitsumoto et al. | 720/610 |
| 2007/0047194 A1 | 3/2007 | Tsai | |

FOREIGN PATENT DOCUMENTS

JP    2003036669 A *    2/2003    ............. G11B 33/12

* cited by examiner

*Primary Examiner* — Timothy Thompson
*Assistant Examiner* — Charles Pizzuto

(57) ABSTRACT

An electronic device includes a housing defining an enclosure, one or more processors in the enclosure, and one or more memory modules in the enclosure. Disk storage drives are provided in an in-line arrangement within the enclosure such that a rear portion of one disk storage drive is adjacent a front portion of another disk storage drive.

11 Claims, 15 Drawing Sheets

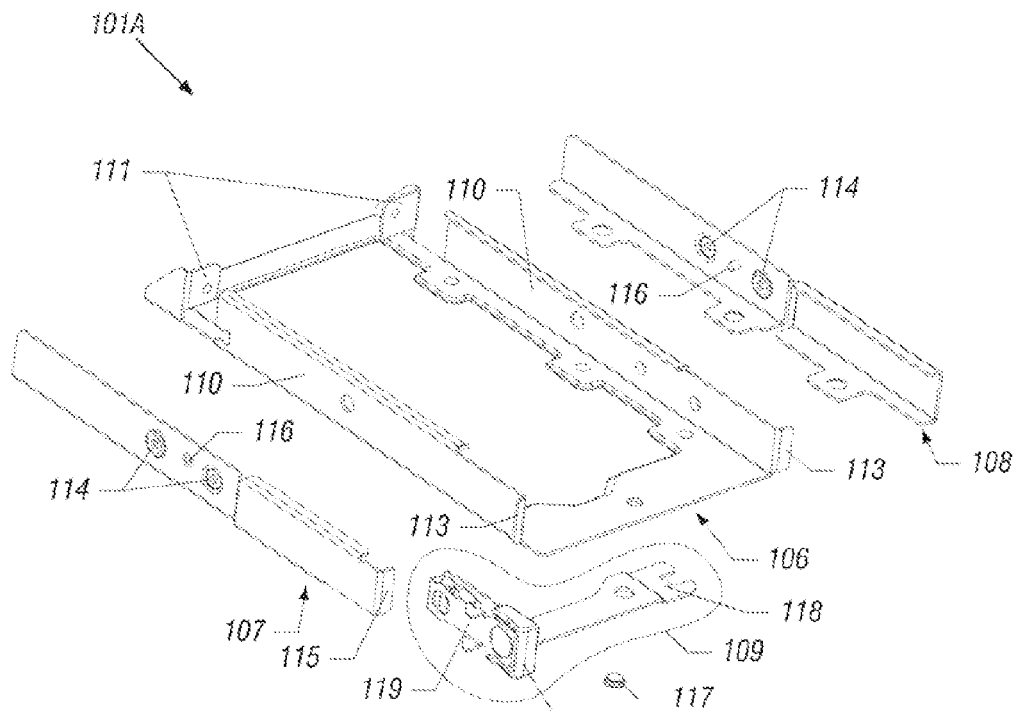
FIG. 11
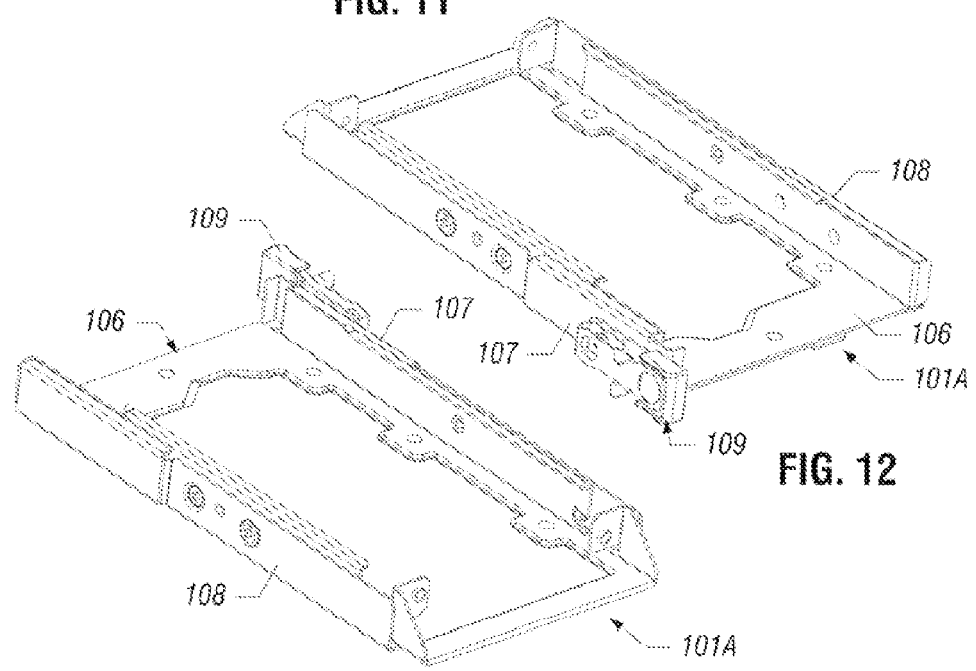
FIG. 12
FIG. 13

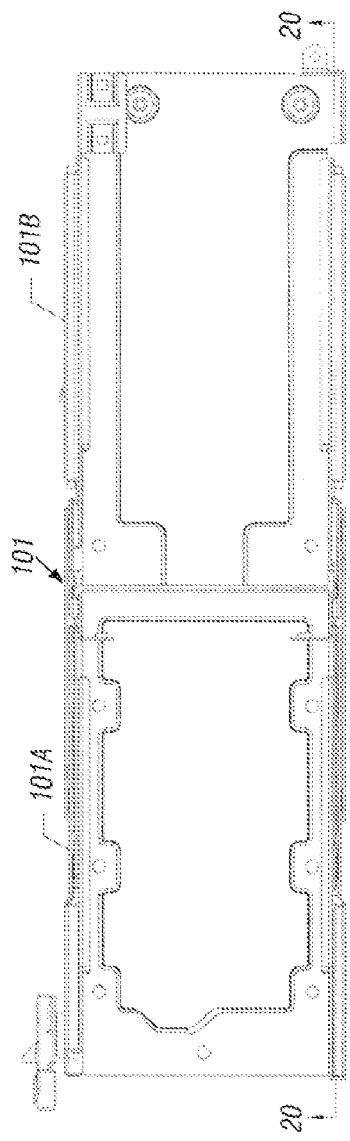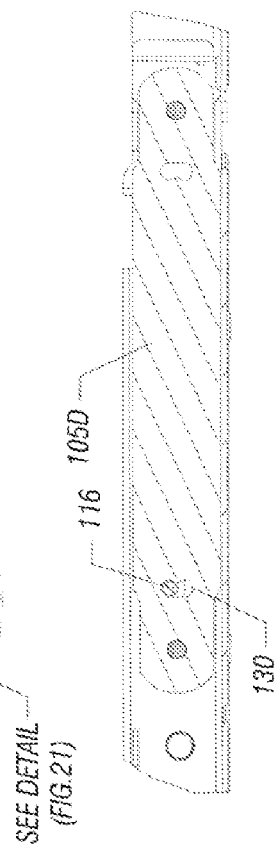
FIG. 19
FIG. 20
FIG. 21

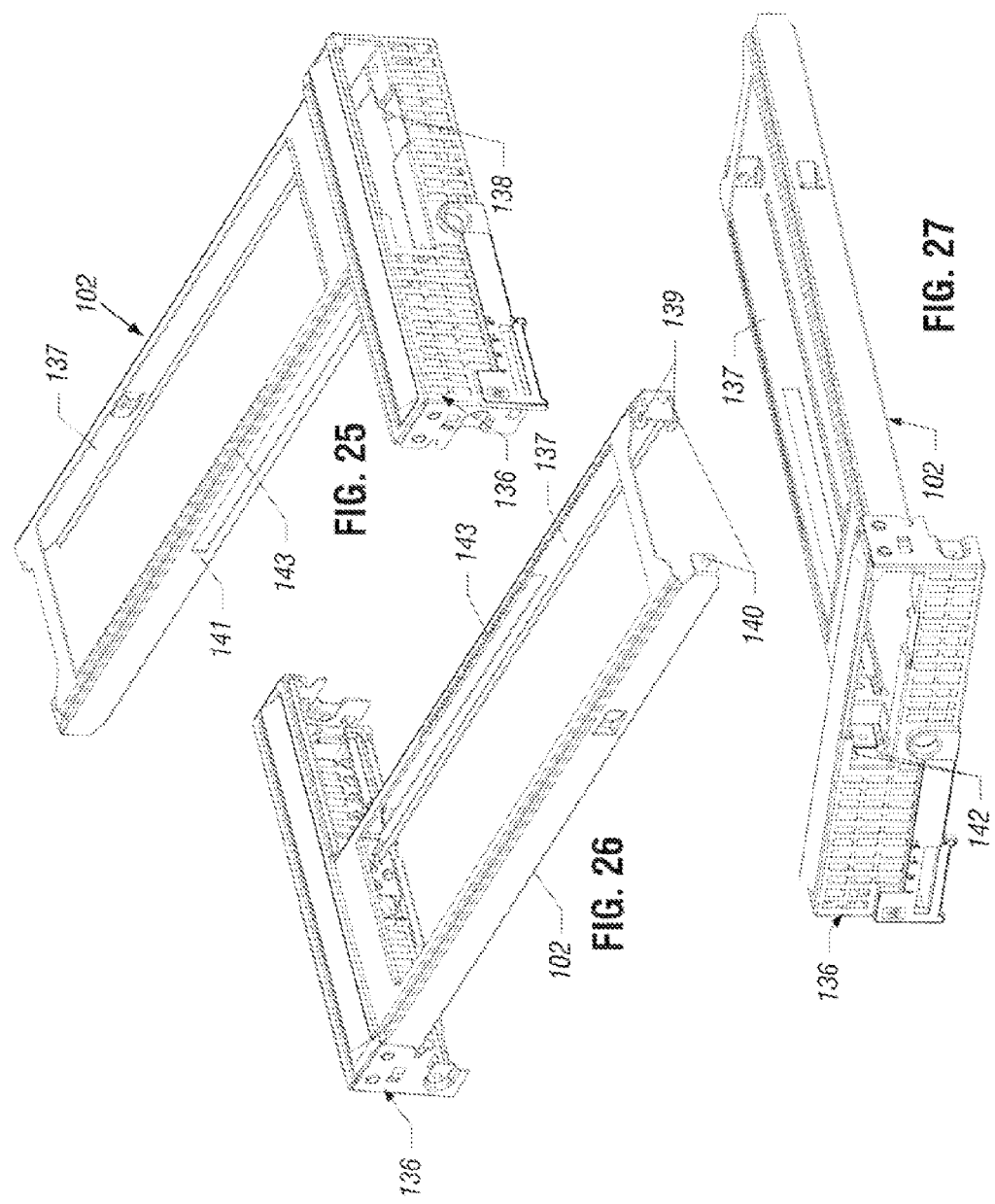

COMPUTER INCLUDING HOT-PLUGGABLE DISK STORAGE DRIVES THAT ARE MOUNTED IN AN IN-LINE ARRANGEMENT

CROSS-REFERENCE TO RELATED APPLICATION

This application is a national stage application under 35 U.S.C. § 371 of PCT/US2009/030393, filed Jan. 8, 2009.

BACKGROUND

Enterprises (such as companies, educational organizations, government agencies, and so forth) often use collections of server computers to provide various functionalities, such as to run software applications, to provide online services, to implement databases, and so forth. For space efficiency, server computers can be in the form of blade servers (or more simply "blades"), where a blade server or blade includes a housing defining an enclosure in which are provided one or more processors, memory devices, input/output (I/O) devices, and disk storage devices. Blade servers typically have relatively small form factors to allow a relatively large number of such blade servers to be placed side by side in a server rack.

As demands on computing capabilities have increased, more components, such as memory modules and/or processors, are squeezed into the finite space defined by a typical blade server enclosure. As a result, the available space for other components, such as disk storage drives, in the blade server enclosure is reduced.

Often, a blade server includes multiple disk storage drives (e.g., two disk storage drives) that are mounted in a side-by-side arrangement in which the front portions of each disk storage drive is accessible by a user through the front of the blade server enclosure. This side-by-side arrangement allows the disk storage drives to be more conveniently inserted or removed, which is desirable with hot-pluggable disk storage drives. With such arrangement, a user can easily hot remove or hot insert the disk storage drives from or into the blade server enclosure. However, as more components are added to the blade server enclosure, it may no longer be possible to install hot-pluggable disk storage drives in the traditional side-by-side arrangement inside the blade server enclosure.

BRIEF DESCRIPTION OF THE DRAWINGS

Some embodiments of the invention are described with respect to the following figures:

FIG. 11 is an exploded view of a front drive cage that is part of the hinged drive tray, according to an embodiment;

FIGS. 12-13 are front and rear perspective views, respectively, of the front drive cage of FIG. 11;

FIG. 19 is a top view of the hinged drive tray at a first hinged position, according to an embodiment;

FIG. 20 is a side view of the hinged drive tray of FIG. 19;

FIG. 21 is an enlarged side view of a portion of the drive tray of FIG. 19;

FIGS. 25-27 are front-right, rear, and front-left perspective views, respectively, of an extension sleeve assembly into which the hinged drive tray is insertable, according to an embodiment;

DETAILED DESCRIPTION

Figure 1:
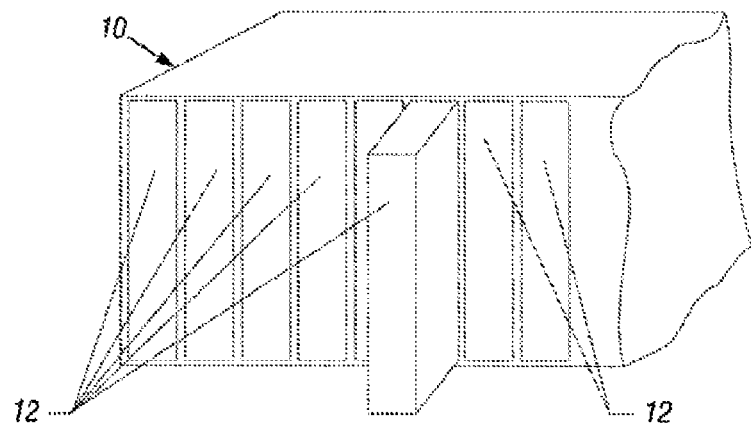
FIG. 1 is a schematic diagram of a server rack in which are mounted multiple blade servers, where the blade servers are configured in accordance with an embodiment.

In accordance with some embodiments, a computer includes a housing that defines an inner chamber or enclosure. One or more processors and one or more memory modules are provided in the computer enclosure. In addition, disk storage drives are mountable inside the computer enclosure in an in-line arrangement according to some embodiments. The disk storage drives are hot-pluggable disk storage drives which can be hot inserted or hot removed from sockets inside the computer enclosure. A "hot-pluggable" disk storage drive is a disk storage drive that can be inserted into or removed from a corresponding socket while the server computer remains live (powered). A "disk storage drive" refers to any storage device that has a rotatable storage medium (e.g., magnetic or optical storage medium) to store data.

The in-line arrangement of the disk storage drives refers to arranging the disk storage drives such that one disk storage drive is behind another disk storage drive. Each disk storage drive has a rear portion and a front portion, where a connector is provided at the rear portion to plug into a respective socket in the computer enclosure. In accordance with the in-line arrangement, the rear portion of a first disk storage drive is adjacent a front portion of a second disk storage drive (assuming there are just two disk storage drives). The in-line arrangement of disk storage drives allows multiple disk storage drives to be fit into a reduced available space inside the computer enclosure due to increased numbers of other components such as memory modules or processors.

In one embodiment, the disk storage drives are provided in the in-line arrangement by mounting the disk storage drives in a hinged drive tray that is removably insertable into the computer enclosure. The hinged drive tray has multiple portions (referred to as "drive cages") that are hingedly connected together. The hinged connection of the drive cages allows a front drive cage to be moved to a different elevation than a rear drive cage such that a disk storage drive can be inserted into or removed from the rear drive cage. The ability to access the rear disk storage drive in the rear drive cage even though the disk storage drives are arranged in the in-line arrangement allows for more convenient insertion and removal of the rear disk storage drive, which is desirable for hot plugging purposes.

In some embodiments, the computer can be a blade server that has a relatively small form factor. By using the in-line arrangement of disk storage drives, hot-pluggable drives can be used in the blade server in a reduced amount of space while still allowing flexible and convenient access to the hot-pluggable drives. Also, use of the in-line arrangement of disk storage drives allows for more efficient usage of the available space for mounting the disk storage drives in the enclosure of the computer housing such that more expensive low profile components (e.g., very low profile memory modules) would not have to be employed to enhance the available space for the disk storage drives.

In the ensuing discussion, reference is made to blade servers and mounting disk storage drives in such blade servers. In other embodiments, disk storage drives can be mounted in other types of electronic devices using any of the described arrangements.

FIG. 1 illustrates an exemplary portion of a server rack 10 in which are mounted multiple blade servers 12. Each blade server 12 can be removed from and inserted into a corresponding slot of the server rack 10. Note that the orientation and arrangement of the blade servers depicted in FIG. 1 are depicted for illustrative purposes, as other arrangements and orientations of blade servers can be provided in other implementations.

In the ensuing discussion, reference is made to a specific exemplary blade server in which disk storage drives arranged according to some embodiments are provided. Note that in other embodiments, other types of blade servers or other electronic devices can be employed.

Figure 2:
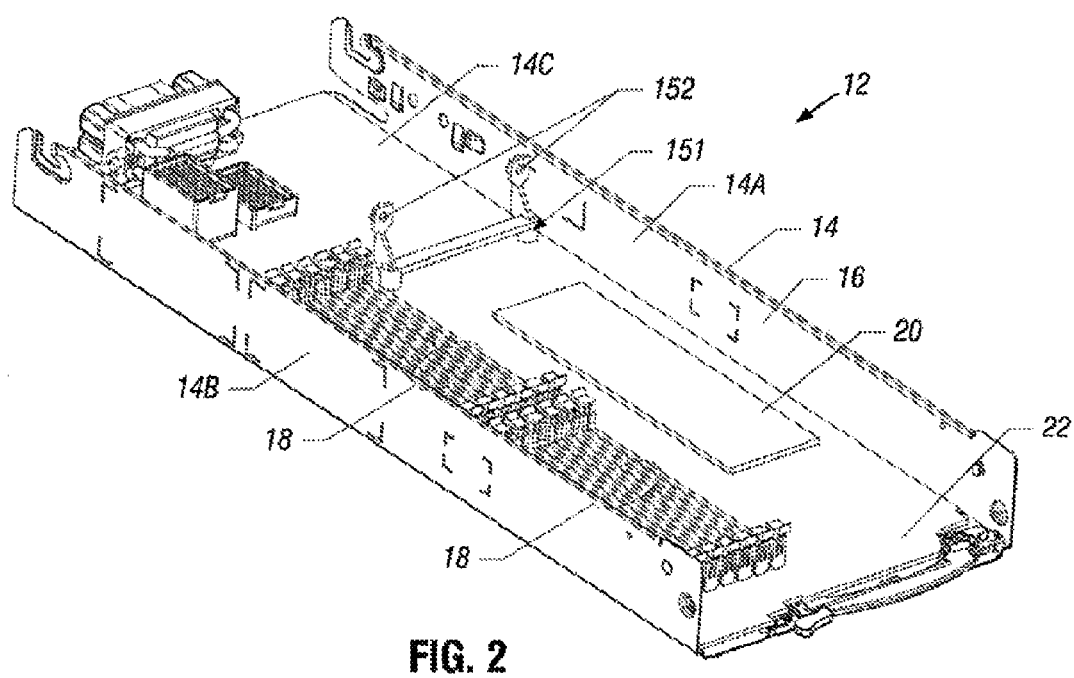
FIGS. 2-5 and 7 are various perspective views of portions of a blade server in which disk storage drives can be mounted in an in-line arrangement according to an embodiment.

FIG. 2 depicts a portion of a blade server 12, which has a housing 14 (including sidewalls 14A and 14B and a bottom plate underneath a system printed circuit board 14C) that defines an inner chamber or enclosure 16. The housing 14 also includes a top plate (not shown).

Memory module sockets 18 are provided in the enclosure 16. Memory modules (e.g., dual in-line memory modules or DIMMs) can be releasably connected to the memory module sockets 18. The memory module sockets 18 are provided in a left side portion of the enclosure 16, while a processor subsystem 20 is provided in a right side portion of the enclosure 16. The processor subsystem 20 includes one or more processors. Note that the arrangement of various components in FIG. 2 and the other remaining figures is provided for exemplary purposes—other arrangements of components in the enclosure 16 can be employed in other implementations.

The memory module sockets 18 and processor subsystem 20 are disposed on the bottom plate of the housing 14. Since the memory module sockets 18 have taken up the left side portion of the enclosure 16, a disk storage drive cannot be installed through the front 22 of the blade server 12 for installation in the left side portion of the enclosure 16. In the example of FIG. 2, almost half of the real estate inside the enclosure 16 is occupied by memory modules, which reduces the space available for the disk storage drives. Instead of memory modules consuming space in the housing 14, it is noted that, in other embodiments, other types of components may consume space in the housing such that disk storage drives arranged according to some embodiments are employed.

As depicted in FIG. 2, the space above the processor subsystem 20 is available for installation of disk storage drives. However, this space above the processor subsystem 20 is longer than it is wide so that two disk storage drives cannot be mounted side-by-side in the available space above the processor subsystem 20. In accordance with some embodiments, instead of providing two disk storage drives side-by-side with the front of each disk storage drive facing outwardly from the front 22 of the blade server 12, the disk storage drives are provided in an in-line arrangement such that one disk storage drive is in front while another disk storage drive is behind the front disk storage drive. As will be explained further below, to allow for access of the disk storage drives even though the disk storage drives have been mounted in the in-line arrangement, a hinged drive tray is employed that can be withdrawn from the front of the blade server housing 14 to allow the rear disk storage drive to be accessed.

Figure 3:
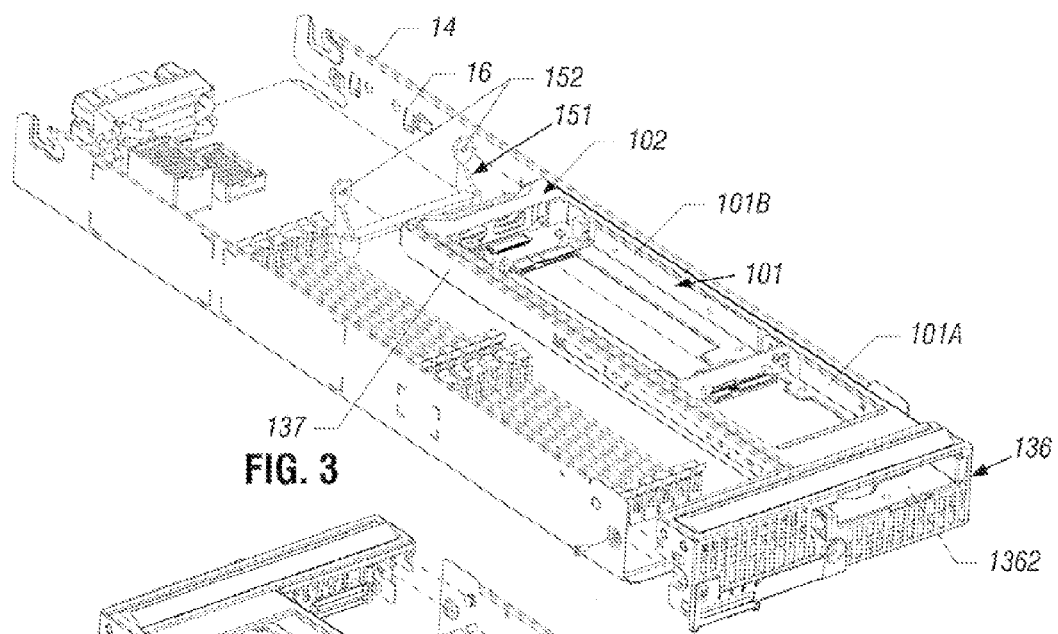
Figure 4:
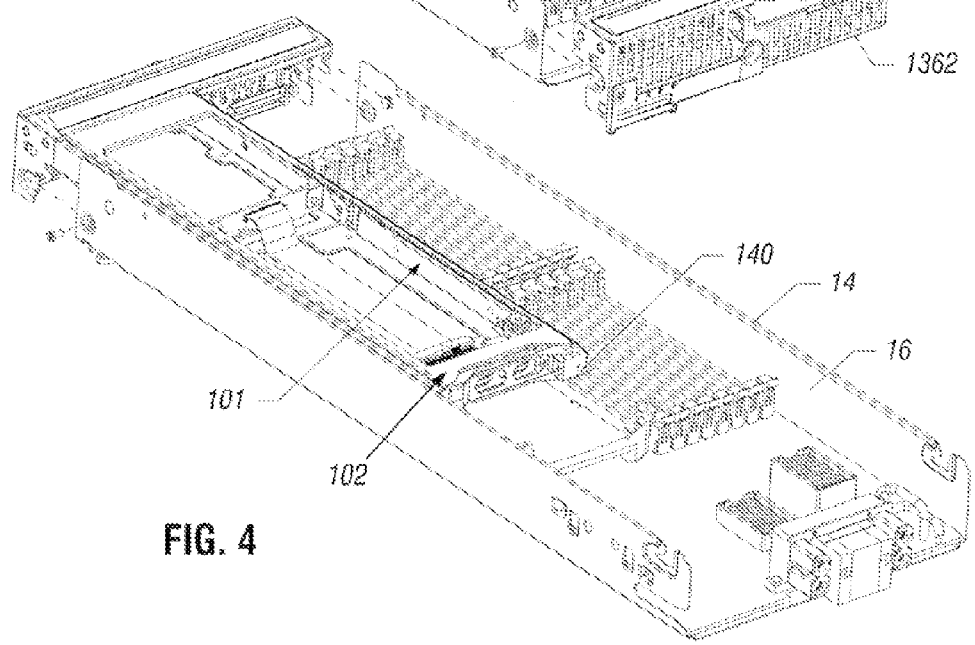

FIGS. 3-4 depict a hinged drive tray 101 that is slidably mounted inside an extension sleeve assembly 102 that is attached inside the blade server enclosure 16. FIG. 3 is a front perspective view of the blade server, whereas FIG. 4 is a rear perspective view of the blade server. The drive tray 101 has a front drive cage 101A to receive a front disk storage drive, and a rear drive cage 101B to receive a rear disk storage drive. As described further below, the front drive cage 101A and rear drive cage 101B are hingedly connected so that more convenient access is provided to access the rear disk storage drive mounted in the rear drive cage 101B.

The extension sleeve assembly 102 in which the drive tray 101 is mounted is attachable to a drive cage support bracket 151 that has openings 152 to receive guide pins 140 (see rear perspective view of the blade server in FIG. 4 as well as the rear perspective view of the extension sleeve assembly 102 in FIG. 26).

Although specific exemplary attachment mechanisms are depicted in the various figures herein, it is noted that the attachment mechanisms are shown for purposes of example. In other implementations, other types of attachment mechanisms can be used.

Figure 5:
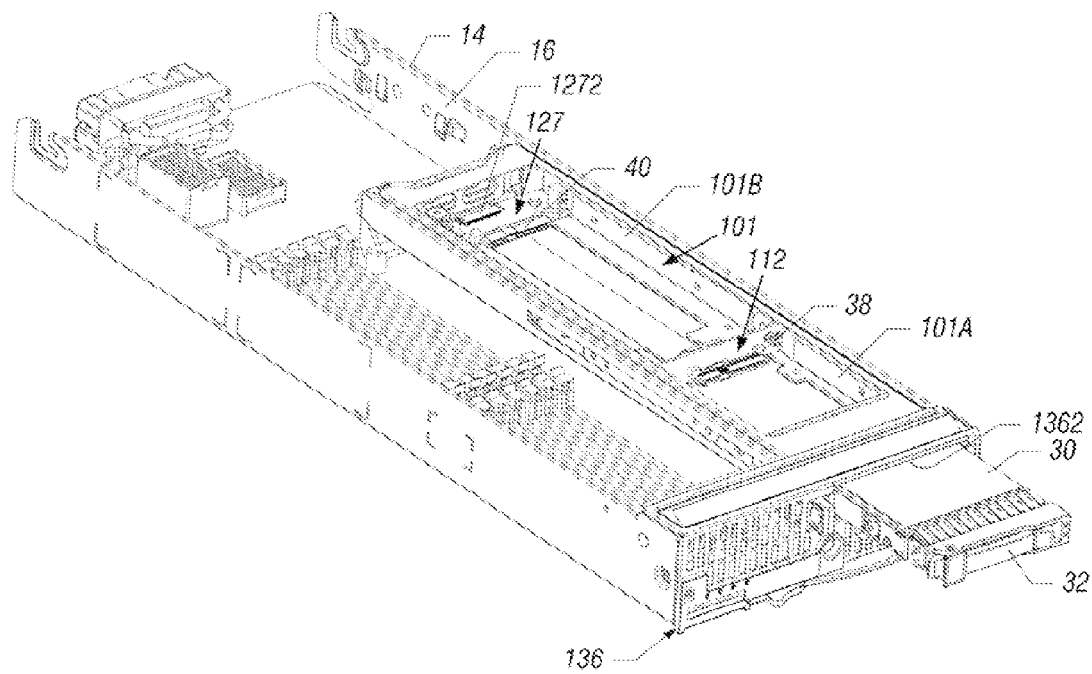

FIG. 5 shows installation of a front disk storage drive 30 into the front drive cage 101A of the drive tray 101. As shown in FIGS. 3 and 5, a front bezel 136 of the extension sleeve assembly 102 has a front opening 1362 that is generally rectangular in shape, and that is sized to receive the front disk storage drive 30. The front disk storage device 30 can be slidably inserted through the front opening 1362 of the front bezel 136 and into the front drive cage 101A.

Figure 6:
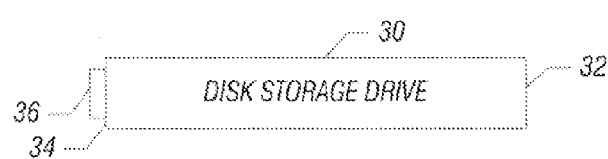
FIGS. 6 and 8 are schematic side views of disk storage drives that can be mounted into a blade server in accordance with an embodiment.

As further shown in the side schematic view of the front disk storage drive 30 of FIG. 6, the front disk storage drive 30 has a front portion 32 (that faces the front of the blade server when the front disk storage drive 30 is inserted into the blade server) and a rear portion 34. A connector 36 is provided at the rear portion 34 of the front disk storage drive 30. The connector 36 is configured to be hot plugged into a drive socket 38 provided on a front backplane socket assembly 112 positioned at the rear of the front drive cage 101A.

As further shown in FIG. 5, the rear drive cage 101B also has a drive socket 40 provided on a rear backplane socket assembly 127 that is positioned at the rear of the rear drive cage 101B.

Figure 7:
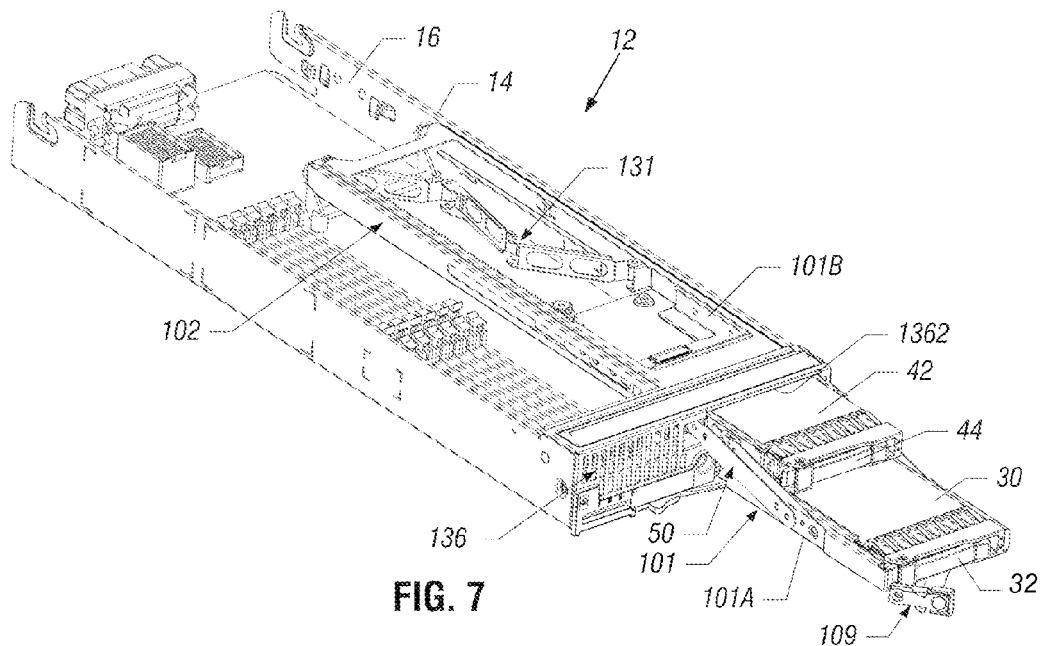

After the front disk storage drive 30 has been installed, FIG. 7 shows installation of a rear disk storage drive 42, which can also be accomplished by insertion through the front opening 1362 of the front bezel 136. As shown in FIG. 7, the drive tray 101 has been pulled outwardly (through the front opening 1362 of the front bezel 136) from the enclosure 16, and the front drive cage 101A has been pivoted downwardly to a different elevation. A user can grip an ejector handle assembly 109 to pull the drive tray 101 outwardly, and the user can grab the front drive cage 101A by the sides and push down to cause the front drive cage 101A to be pivoted downwardly, such that the front drive cage 101A drops below the front opening 1362 of the front bezel 136 to allow room for the rear disk storage drive 42 to be inserted through the front opening 1362 of the front bezel 136 into the rear drive cage 101B.

Although FIG. 7 shows the front drive cage 101A being pivoted downwardly, it is noted that in a different embodiment, the front drive cage 101A can be pivoted upwardly. More generally, the front drive cage 101A can be pivoted to a different elevation than the rear drive cage 101B, such that the rear drive cage 101B can be accessed to allow convenient insertion or removal of the rear disk storage drive 42.

As further depicted in FIG. 7, when the drive tray 101 is pulled outwardly from the extension sleeve assembly 102, a cable management arm 131 is pulled from a collapsed position to an extended position (as depicted in FIG. 7). A drive cable (not shown) is provided on the cable management arm 131. The cable management arm 131 is provided to avoid entanglement of the drive cable due to slidable motion of the drive tray 101 between an extended position (when the drive tray 101 has been pulled out of the blade server housing 14) and a retracted position (when the drive tray 101 has been pushed back into the blade server housing 14). The cable management arm 131 is also provided to prevent cables from interfering with or entangling with processor heat sinks underneath the drive tray 101.

The pivoting motion of the front drive cage 101A relative to the rear drive cage 101B is accomplished by use of a hinge mechanism 50 (which is described in further detail below).

Figure 8:

As further shown in FIG. 8, the rear disk storage drive 42 has a front portion 44 (that faces the front of the blade server when the rear disk storage drive 42 is inserted into the blade server) and a rear portion 46. A connector 48 is provided at the rear portion 46 of the rear disk storage drive 42, where the connector 48 is able to be hot plugged into the rear drive socket 40 (FIG. 5) when the rear disk storage drive 42 is inserted into the rear drive cage 101B.

Figures 9, 10:
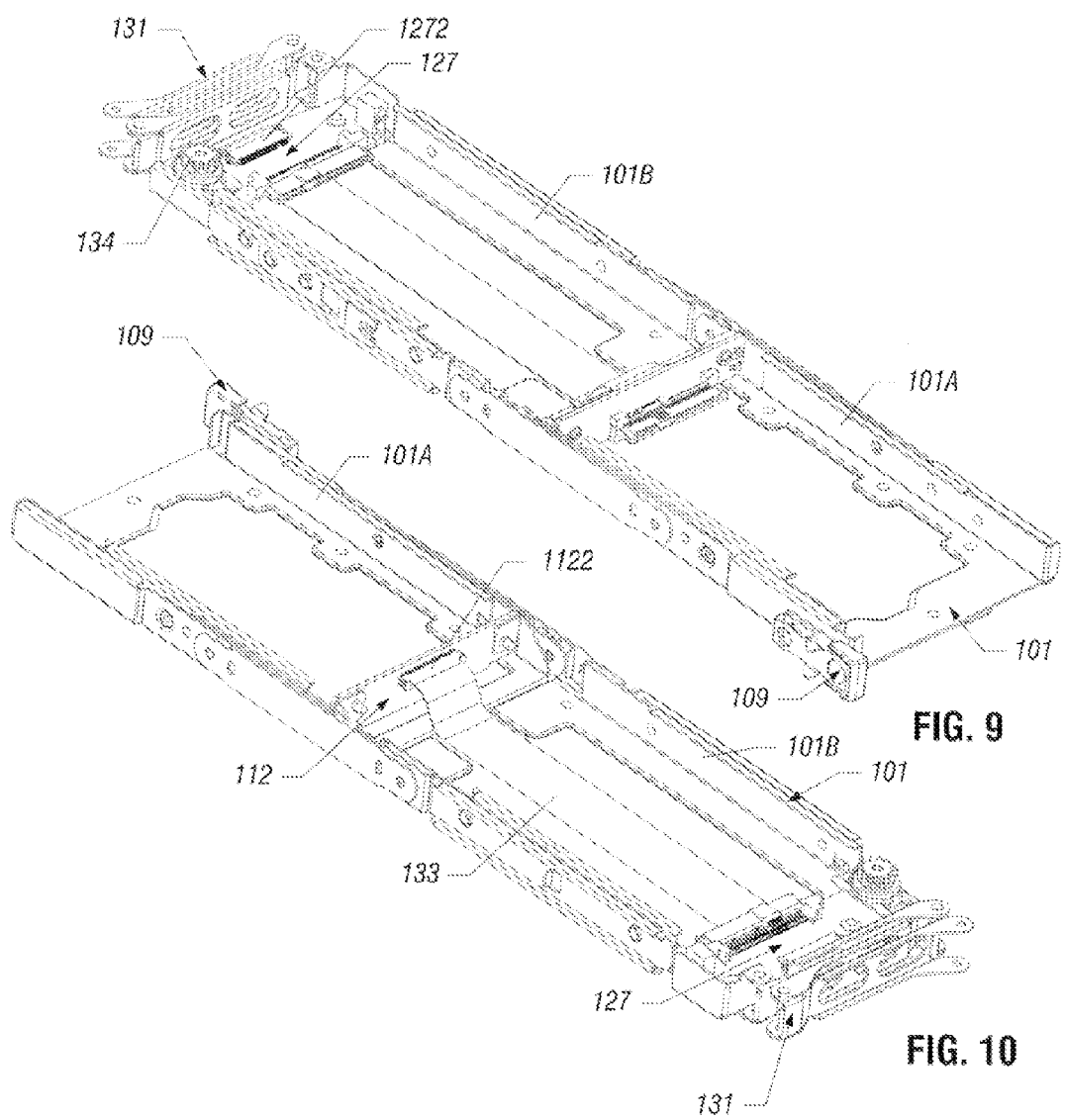
FIGS. 9 and 10 are front and rear perspective views, respectively, of a hinged drive tray according to an embodiment.

FIG. 9 is a front perspective view of the hinged drive tray 101 by itself, and FIG. 10 is a rear perspective view of the drive tray 101. As depicted in FIGS. 9 and 10, the ejector handle assembly 109 is in its retracted position. However, this ejector handle assembly 109 can be pulled forwardly by a user to allow the drive tray 101 to be pulled out from the extension sleeve assembly 102 (see FIG. 7). As depicted in FIGS. 9 and 10, the cable management arm 131 is in its collapsed position prior to the drive tray 101 being pulled outwardly from the extension sleeve assembly 102 (as shown in FIG. 7).

As best seen in FIG. 10, the front backplane socket assembly 112 is electrically connected to the rear backplane socket assembly 127 by a flat, flexible cable 133. One end of the flexible cable 133 is connected to a connector 1122 provided on the front backplane socket assembly 112, and another end of the flexible cable is connected to a connector 1272 (FIGS. 5 and 9) of the rear backplane socket assembly 127.

As shown in FIGS. 11-13 the front drive cage 101A includes four parts: a front drive receptacle 106, a front-left guide rail 107, a front-right guide rail 108, and the ejector handle assembly 109. FIG. 11 shows an exploded view of the front drive cage 101A, FIG. 12 shows a front perspective view of the assembled front drive cage 101A, and FIG. 13 shows a rear perspective view of the assembled front drive cage 101A. The front drive receptacle 106 is used to house the front disk storage drive (30 in FIG. 5). The front drive receptacle 106 includes two drive guide flanges 110 that restrict the horizontal and vertical movement of the front disk storage drive (30) when it is installed. In addition, there are two drive backplane flanges 111, each equipped with screw extrusions (or other form of attachment mechanism) that are used for mounting of the front backplane socket assembly 112. A drive ejection flange 113 is incorporated into a drive guide flange 110 to aid in drive removal during hot plug activities.

The front-left guide rail 107 is assembled to the left side of the front drive receptacle 106 with stake features (or other form of attachment mechanism). The front-left guide rail 107 serves several purposes. The front-left guide rail 107 has two hinge link embosses 114 that are used to mount hinge links 105 (105A, 105B, 105C, 105D) depicted in FIGS. 17-18) to the assembly. The hinge links 105 are part of the hinge mechanism 50 (FIG. 7) that allow pivoting of the front drive cage 101A relative to the rear drive cage 101B.

In addition, the front-left guide rail 107 has a drive insertion flange 115 that aids in the insertion of the front disk storage drive (30) as well as prevents the front disk storage drive from falling out of the assembly as a result of a shock experienced by the assembly. The front-left guide rail 107 also has a rotation restricting pin 116.

The front-right guide rail 108 is similar to the front-left guide rail 107, and is assembled to the right side of the front drive receptacle 106 using stake features (or other form of attachment mechanism). The front-right guide rail 108 also has two hinge link embosses 114 that are used to mount the hinge links 105 to the assembly, and a rotation restricting pin 116.

As depicted in FIG. 11, a low profile rivet 117 (or some other attachment mechanism) is used to assemble the ejector handle assembly 109 to the front drive receptacle 106. The ejector handle assembly 109 includes three parts: an ejector lever 118, an ejector spring lock 119, and an ejector handle 120.

Figure 14:
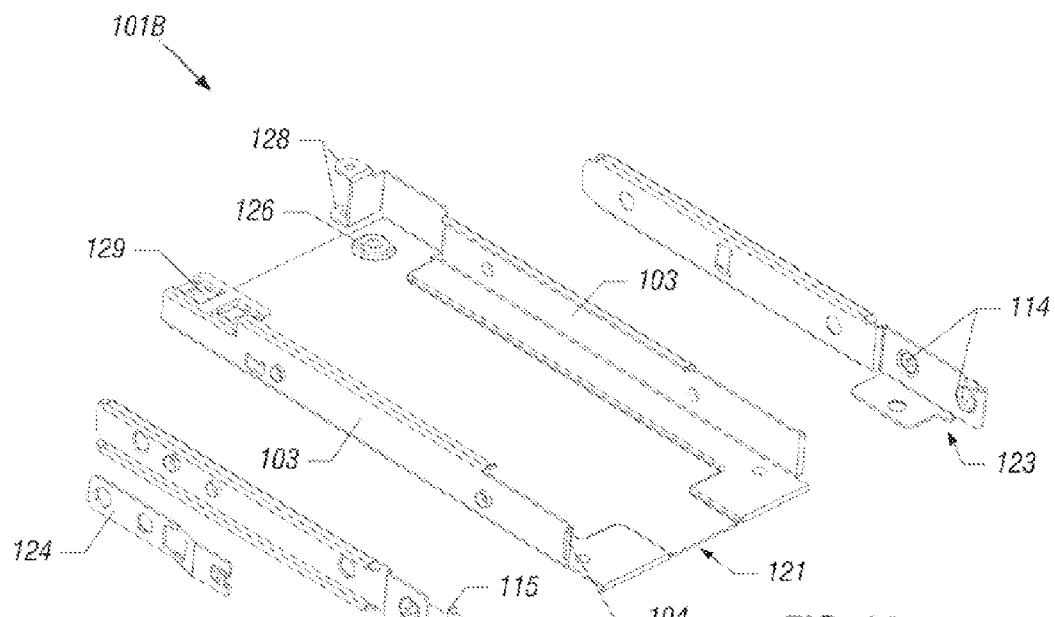
FIG. 14 is an exploded view of a rear drive cage that is part of the hinged drive tray, according to an embodiment.
Figure 15:
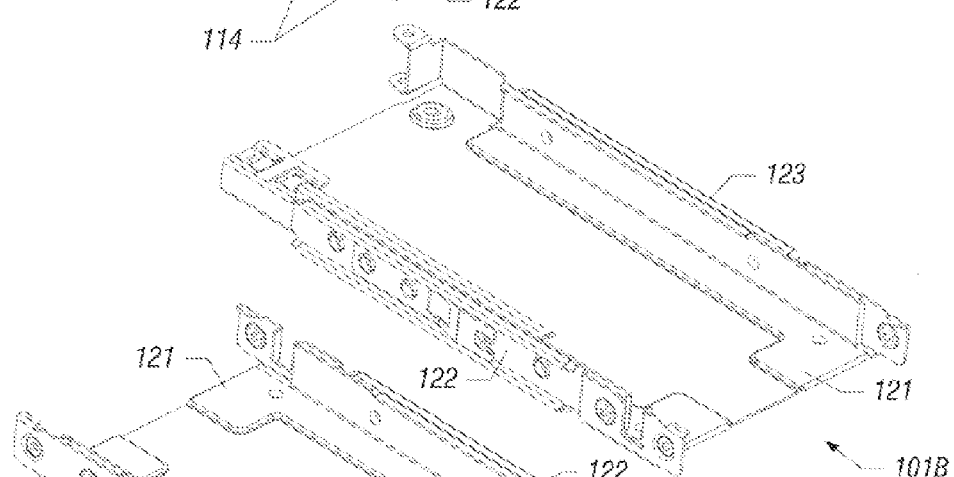
FIGS. 15-16 are front and rear perspective views, respectively, of the rear drive cage of FIG. 14.
Figure 16:
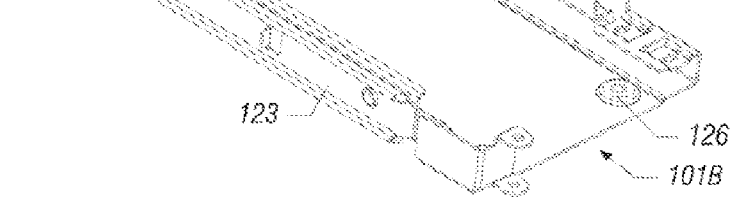

FIGS. 14-16 show the rear drive cage 101B in greater detail. FIG. 14 shows an exploded view of the rear drive cage 101B. FIG. 15 shows a front, perspective view of the assembled rear drive cage 101B, and FIG. 16 shows a rear, perspective view of the assembled rear drive cage 101B.

The rear drive cage 101B is similar in construction to the front drive cage 101A. The rear drive cage 101B includes four parts: a rear drive receptacle 121, a rear-left guide rail 122, a rear-right guide rail 123, and a drive cage spring latch 124. The spring latch 124 can be made of stainless spring steel or some other flexible material that can retain its form after deflection.

The rear drive receptacle 121 is used to house the rear disk storage drive (42 in FIG. 7). The rear drive receptacle 121 includes two drive guide flanges 103 that restrict the horizontal and vertical movement of the rear disk storage drive when it is installed. In addition, there are two drive backplane embosses 126 provided in the bottom surface of the rear drive receptacle 121 that are used to mount the rear drive backplane socket assembly 127 (FIG. 9). A drive ejection flange 104 has also been incorporated into the rear drive receptacle 121 to aid in drive removal during hot plug activities.

The rear of the drive receptacle 121 has two cable arm mounting flanges 128 (or some other form of attachment mechanism) that are used to assemble the cable management arm 131 (FIGS. 9-10) to the rear drive cage 101B. The rear drive receptacle 121 also includes a damper mounting flange 129 to which is mounted a motion control damper 134 (FIGS. 9-10).

The rear-left guide rail 122 is assembled to the left side of the rear drive receptacle 121 with stake features (or other form of attachment mechanism). The rear-left guide rail 122 has two hinge link embosses 114 that are used to mount the hinge links 105 to the assembly. In addition, the rear-left guide rail 122 has a drive insertion flange 115 that aids in the insertion of the rear disk storage drive and prevents the rear disk storage drive from falling out of the assembly as a result of shock. The rear-left guide rail 122 also has a drive cage spring latch 124.

The rear-right guide rail 123 is similar to the rear-left guide rail 122, and is assembled to the right side of the rear drive receptacle 121 using stake features (or other form of attachment mechanism). The rear-right guide rail 123 also has two hinge link embosses 114 that are used to mount the hinge links 105 to the assembly.

Figures 17, 18:
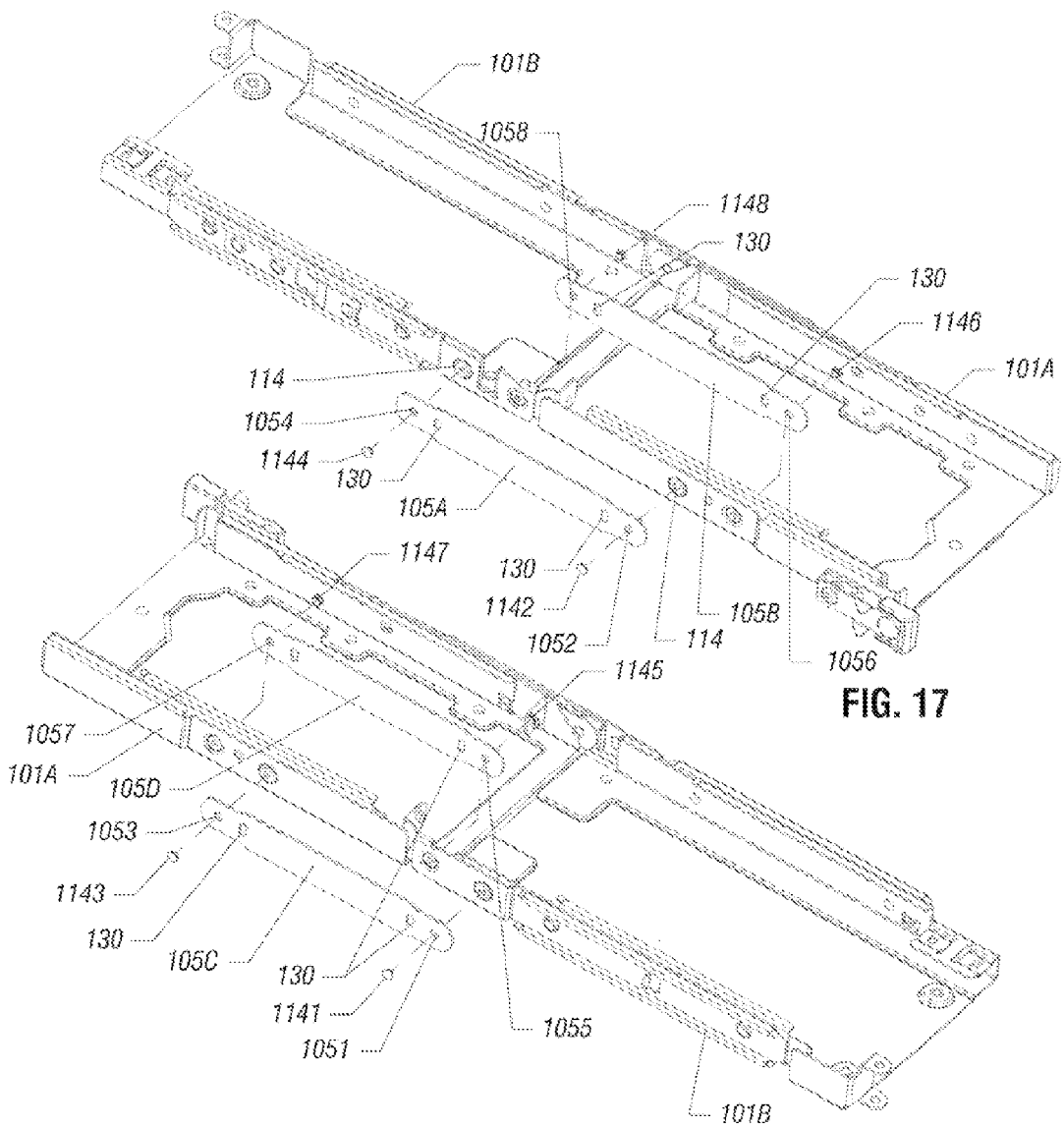
FIGS. 17-18 are front and rear perspective views, respectively, of the hinged drive tray with hinge links shown detached from the drive tray, where the hinge links are part of a hinge mechanism of the hinged drive tray according to an embodiment.

As depicted in FIGS. 17-18, the front drive cage 101A and the rear drive cage 101B are joined together by four hinge links 105 (105A-105D depicted). The hinge links 105A-105D are part of the hinge mechanism 50 (FIG. 7) that allows for the front and rear drive cages 101A and 101B of the hinged drive tray 101 to pivot with respect to each other. The hinge links 105A and 105C are attached to outside surfaces of the front and rear drive cages 101A, 101B, and thus are considered outside hinge links. The hinge links 105B and 105D are mounted to inner surfaces of the front and rear drive cages 101A, 101B and thus are considered inner hinge links.

The outer hinge link 105A has a first attachment opening 1052 to allow a corresponding rivet 1142 to attach one end portion of the hinge link 105A to a corresponding hinge link emboss 114 on the outer surface of the front drive cage 101A. Similarly, the outer hinge link 105A has a second attachment opening 1054 to allow the second end portion of the outer hinge link 105A to be attached by a corresponding rivet 1144 to a cage hinge link emboss 114 on the rear drive cage 101B. Different attachment mechanisms can be employed in other implementations.

The inner hinge link 105B similarly has attachment openings 1056 and 1058 for attachment by respective rivets 1146 and 1148 to internal hinge link embosses 114 provided on the inner surfaces of the front and rear drive cages 101A, 101B.

Similarly, in the rear, perspective view of FIG. 18, the outer hinge link 105C has attachment openings 1051 and 1053 for attachment by rivets 1141 and 1143 to respective hinge link embosses 114 on the outer surfaces of the front and rear drive cages 101A, 101B. The inner hinge link 105D has attachment openings 1055 and 1057 for attachment by corresponding rivets 1145 and 1147 to inner cage hinge link embosses 114 provided on inner surfaces of the front and rear drive cages 101A, 101B.

Note that each of the hinge links 105A-105D is attached at a single point to each of the front and rear drive cages 101A, 101B, which allows each hinge link 105-105D to freely rotate about the single point with respect to the rear or front drive cage 101A or 101B. This ability to freely rotate about the single point enables the hinge mechanism that includes the hinge links 105A-105D to allow pivoting of the front and rear drive cages 101A and 101B.

As further depicted in FIGS. 17 and 18, each of the hinge links 105A-105D is provided with rotation restriction slots 130 that are used to limit the amount of rotation of the hinge links 105A-D relative to the front and rear drive cages 101A and 101B. When attached, the rotation restriction slots 130 engage rotation restriction pins 116 provided on the guide rails 107 and 108 of the front drive cage 101A shown in FIG. 11. More specifically, the rotation restriction pins 116 are provided on the inner surfaces of the guide rails 107 and 108, such that the rotation restriction is caused by engagement of the rotation restriction slots 130 on inner hinge links 105B and 105D with respect to the rotation restriction pins 116.

In one example, the front drive cage 101A is allowed to rotate 12.5° by interaction of the rotation restriction slots 130 and rotation restriction pins 116 with respect to the rear drive cage 101B when the rear drive cage 101B is held stationary. However, in other implementations, rotations by other amounts can also be provided.

FIGS. 19-24 illustrate relative pivoting of the front and rear drive cages 101A and 101B. FIG. 19 shows a top view of the drive tray 101 that includes the front and rear drive cages 101A and 101B. FIG. 20 shows a side view of the inner surfaces of the front and rear drive cages 101A and 101B. FIG. 21 is an enlarged view showing interaction of a rotation restriction slot 130 of inner hinge link 105D with a corresponding rotation restriction pin 116. In FIGS. 19-21, the front and rear drive cages 101A and 101B are at a first hinged position with respect to each other (in this case, the front and rear drive cages 101A and 101B are at the same elevation).

Figure 22:
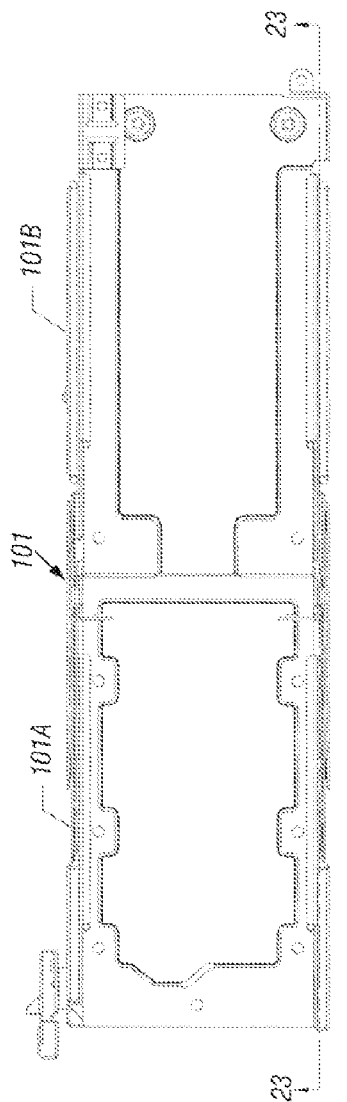
FIG. 22 is a top view of the hinged drive tray at a second hinged position, according to an embodiment.
Figure 23:
FIG. 23 is a side view of the hinged drive tray of FIG. 22.
Figure 24:
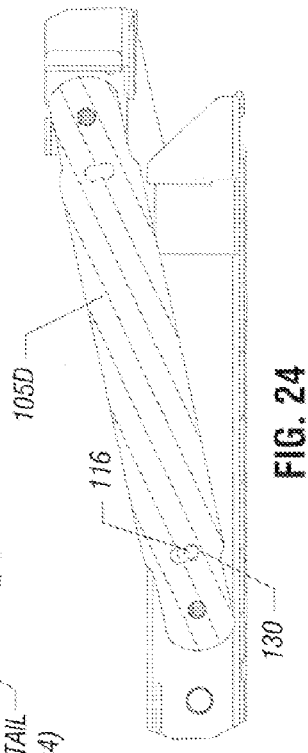
FIG. 24 is an enlarged side view of a portion of the drive tray of FIG. 22.

FIG. 22 shows the top view of the drive tray 101 when the front drive cage 101A has been pivoted downwardly relative to the rear drive cage 101B such that the front and rear drive cages 101A and 101B are at a second, hinged position with respect to each other. An inner side, view of the drive tray 101 is provided in FIG. 23, which shows the front drive cage 101A pivoted to a lower elevation than the rear drive cage 101B. FIG. 24 shows how the rotation restriction pin 116 and rotation restriction slot 130 of the inner hinge link 105D limit pivoting of the front drive cage 101A relative to the rear drive cage 101B.

In accordance with some embodiments, even though the front drive cage 101A has been pivoted to a different elevation relative to the rear drive cage 101B, the front drive cage 101A has remained generally parallel to the rear drive cage 101B. The ability of the front drive cage 101A to remain generally parallel to the rear drive cage 101B is enabled by the construction of the hinge mechanism 50 (including inner and outer hinge links). Since a server rack (such as server rack 10 in FIG. 1) can have blade servers 12 positioned relatively close to each other side by side (or one on top of another), the ability of the pivoted front drive cage 101A to remain generally parallel to the rear drive cage 101B avoids the pivoted front drive cage 101A impacting the neighboring blade server and interfering with pivoting of the front drive cage 101A. The front drive cage 101A is considered to be "generally parallel" to the rear drive cage 1013 if the main surface of the front drive cage 101A (on which the front disk storage drive is mounted) remains substantially parallel (to within less than 5°, for example) to the main surface of the rear drive cage 101B (on which the rear disk storage drive is mounted).

FIG. 25 shows a front-left perspective view of the extension sleeve assembly 102, FIG. 26 shows a rear perspective view of the extension sleeve assembly 102, and FIG. 27 shows a front-right perspective view of the extension sleeve assembly 102.

The extension sleeve assembly 102 includes two main components: the front bezel 136 and a tray sleeve 137. The two parts are joined together using stake features or some other form of attachment mechanism. The front bezel 136 is used to retain the hinged drive tray 101 in the server enclosure 16. The front bezel 136 is equipped with a latch pin 138 to lock the drive tray 101 in the blade server enclosure 16.

The tray sleeve 137 is the receptacle for the drive tray 101. To limit the horizontal and vertical movement of the drive tray 101, the sides of the tray sleeve 137 are generally shaped like a "C". Two cable arm mounting flanges 139 are provided near the rear of the tray sleeve 137 to attach to the cable management arm 131 (FIG. 10). Also, as noted above, two support guide pins 140 are located at the rear of the tray sleeve 137 to engage the support bracket 151 (FIG. 2) inside the server enclosure 16. The support guide pins 140 are used to stabilize the assembly of the drive tray 101 and extension sleeve assembly 102 when the assembly is installed in the enclosure 16.

The tray sleeve 137 also includes a damper gear rack 143 to engage the motion control damper 134 (FIGS. 9-10). The motion control damper 134 engages the damper gear rack 143 to reduce the speed at which the drive tray 101 can be pulled out of or inserted into the blade server housing 14. This avoids excessive shock applied to the drive tray 101 which can damage the disk storage drives.

Figure 28:
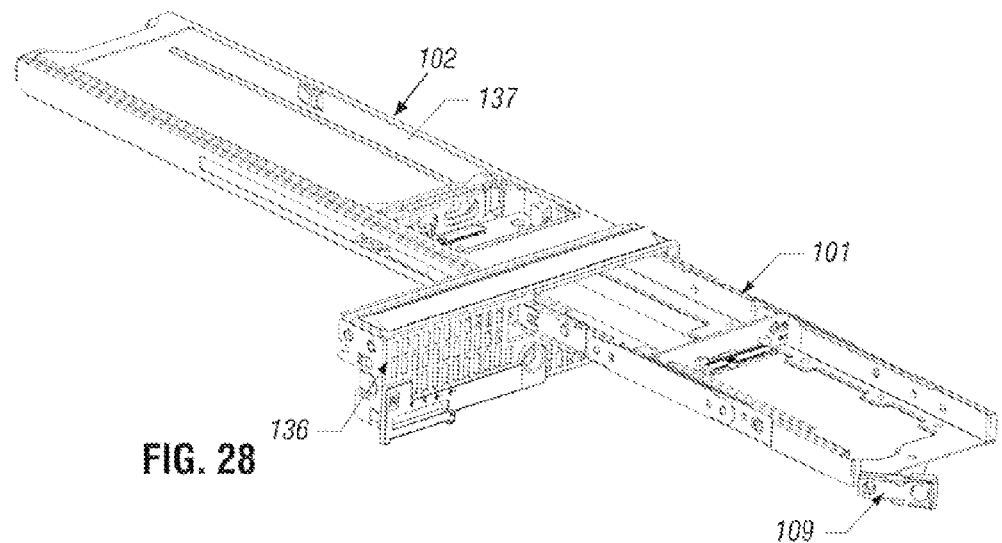
FIG. 28 is a front perspective view of partial insertion of the hinged drive tray into the extension sleeve assembly of FIGS. 25-27, according to an embodiment.
Figure 29:
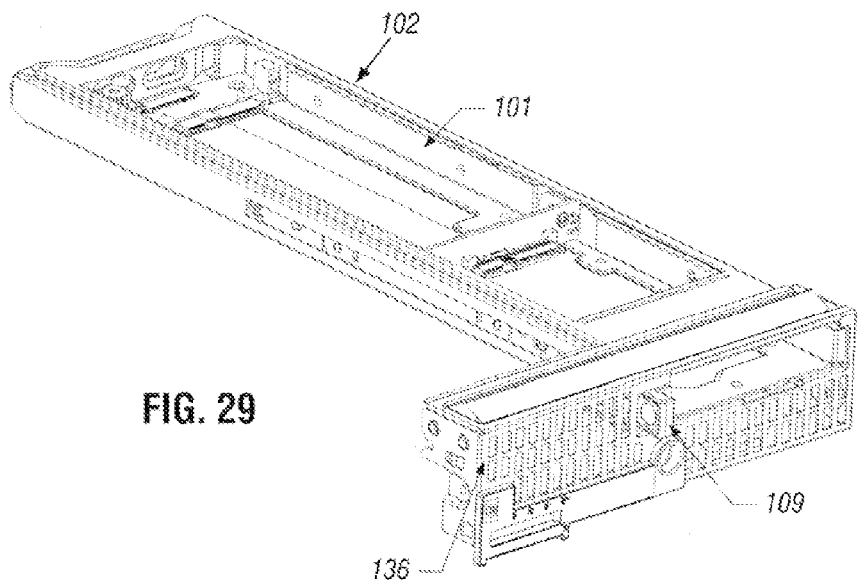
FIG. 29 is a front perspective view of full insertion of the hinged drive tray into the extension sleeve assembly of FIGS. 25-27, according to an embodiment.

To install the drive tray 101, the front-left guide rail 107, the front-right guide rail 108, the rear-left guide rail 122, and the rear-right guide rail 123 (FIGS. 11-16) are aligned with the tray sleeve 137, and the drive tray 101 is pushed into the tray extension sleeve 102. Such installation is depicted in FIGS. 28 and 29. FIG. 28 shows the drive tray 101 partially inserted into the tray sleeve 137, and FIG. 29 shows the drive tray 101 inserted completely into the tray sleeve 137. As the drive tray 101 is inserted into the tray sleeve 137, the drive cage spring latch 124 (FIG. 14) of the rear drive cage 101B deflects momentarily and then returns to its original position once the spring latch 124 engages the spring latch stop cutout 141 (FIG. 25) of the tray sleeve 137.

Once the drive tray 101 has been inserted far enough into the tray sleeve 137, the ejector handle assembly 109, when in the open position (FIG. 28), will engage the latch pin 138. The ejector handle assembly 109 is then rotated from the open position (FIG. 28) to the closed position (FIG. 29). As the ejector handle assembly 109 is closed, a force from the ejector lever 118 (FIG. 11) is applied to the backside of the latch pin 138 to pull the drive tray 101 into the tray sleeve 137. Then, with the ejector handle assembly 109 in the closed position, the drive tray 101 is fully seated inside the extension sleeve assembly 102. At the end of the travel of the ejector handle assembly 109, the ejector spring lock 119 (FIG. 11) engages the ejector handle lock cutout 142 (FIG. 27) of the front bezel 136 to lock the ejector handle assembly 109 into the extension sleeve assembly 102. This prevents the drive tray 101 from falling out of the extension sleeve assembly 102 in response to shock.

Figure 30:
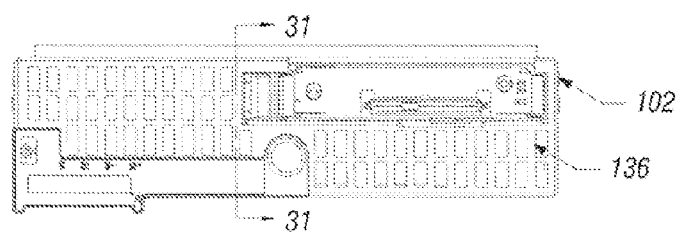
FIG. 30 is a front view of the extension sleeve assembly, according to an embodiment.
Figure 31:
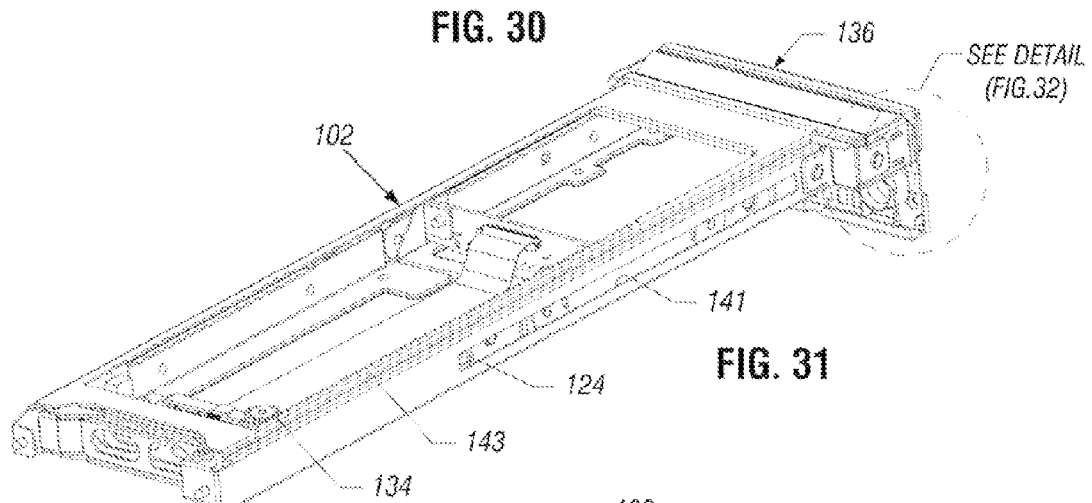
FIG. 31 is a rear perspective view of the extension sleeve assembly of FIG. 30.
Figure 32:
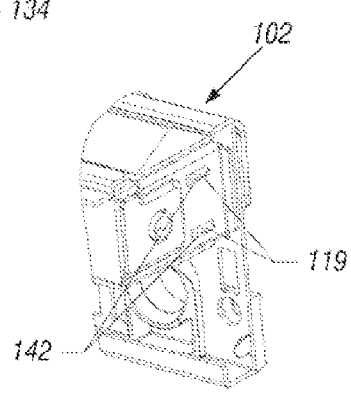
FIG. 32 is an enlarged perspective view of a portion of the extension sleeve assembly of FIG. 30.

Engagement of the ejector spring lock 119 with the ejector handle lock cutout 142 is depicted in FIGS. 30-32. FIG. 30 shows a front view of the front bezel 136 of the extension sleeve assembly, FIG. 31 shows a rear, right perspective view of the extension sleeve assembly 102, and FIG. 32 shows an enlarged view of a side portion of the front bezel 136 to illustrate engagement of the ejector spring lock 119 of the ejector handle assembly 109 with the ejector handle lock cutout 142.

Subsequently, the drive tray 101 can be pulled from the extension sleeve assembly 102 by pushing the ejector spring lock 119 on the ejector handle 120. Pushing the ejector spring lock 119 disengages the ejector spring lock 119 from the ejector handle lock cutout 142. The drive tray 101 can then be pulled out of the extension sleeve assembly 102. While the drive tray 101 is being pulled out, the motion control damper 134 rides along the damper gear rack 143 to prevent a user from pulling the drive tray 101 out too quickly. When the drive tray 101 reaches its maximum extension, the drive cage spring latch 124 contacts the spring latch stop cutout 141 to prevent the drive tray 101 from being pulled out of the extension sleeve assembly 102. At this point, the front drive cage 101A can be pivoted downwardly to allow access to the rear drive cage 101B, as shown in FIG. 7.

Figure 33:
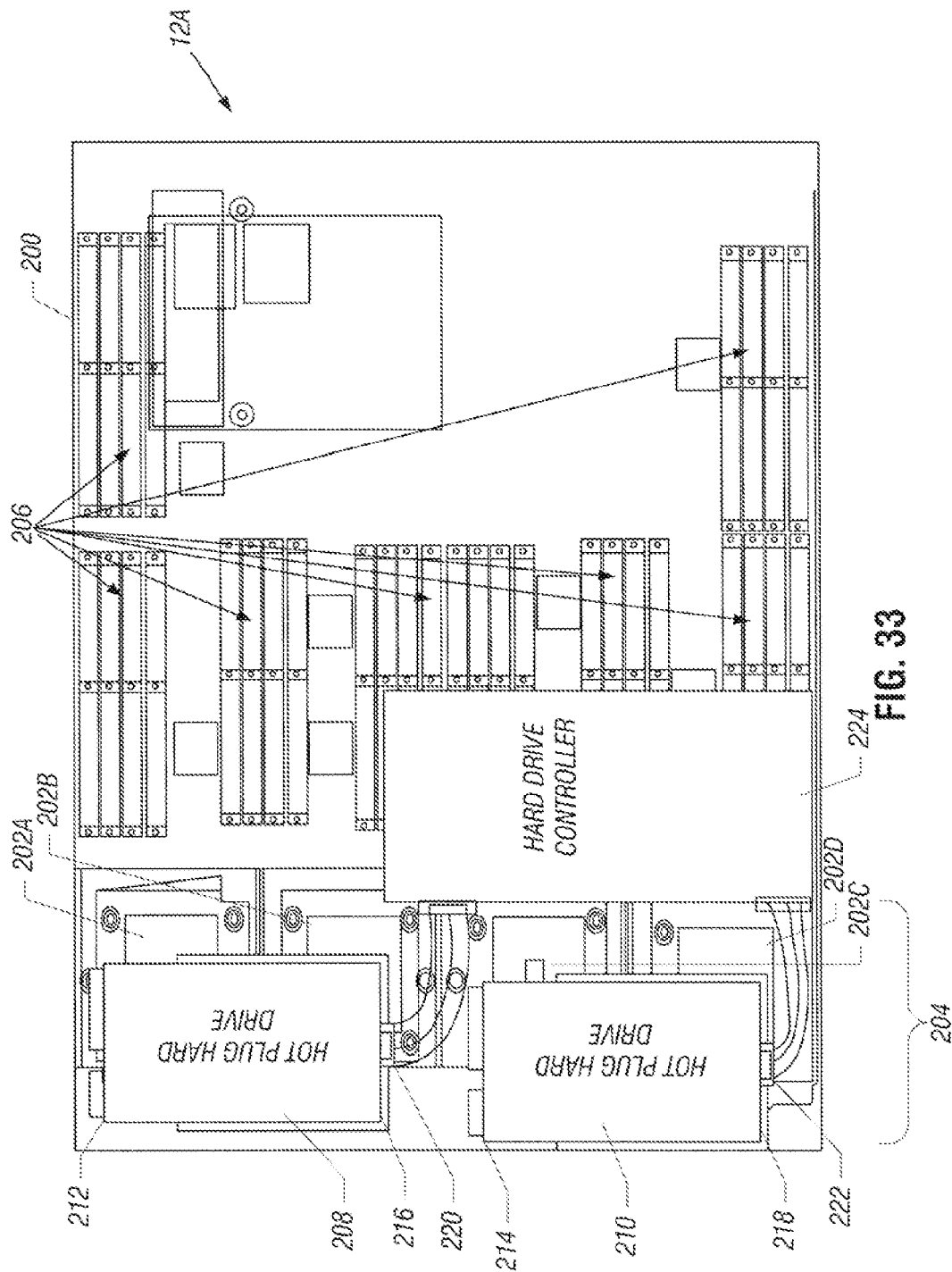
FIG. 33 is a top view of another exemplary blade server enclosure in which disk storage drives can be mounted in an in-line arrangement according to another embodiment.
Figure 34:
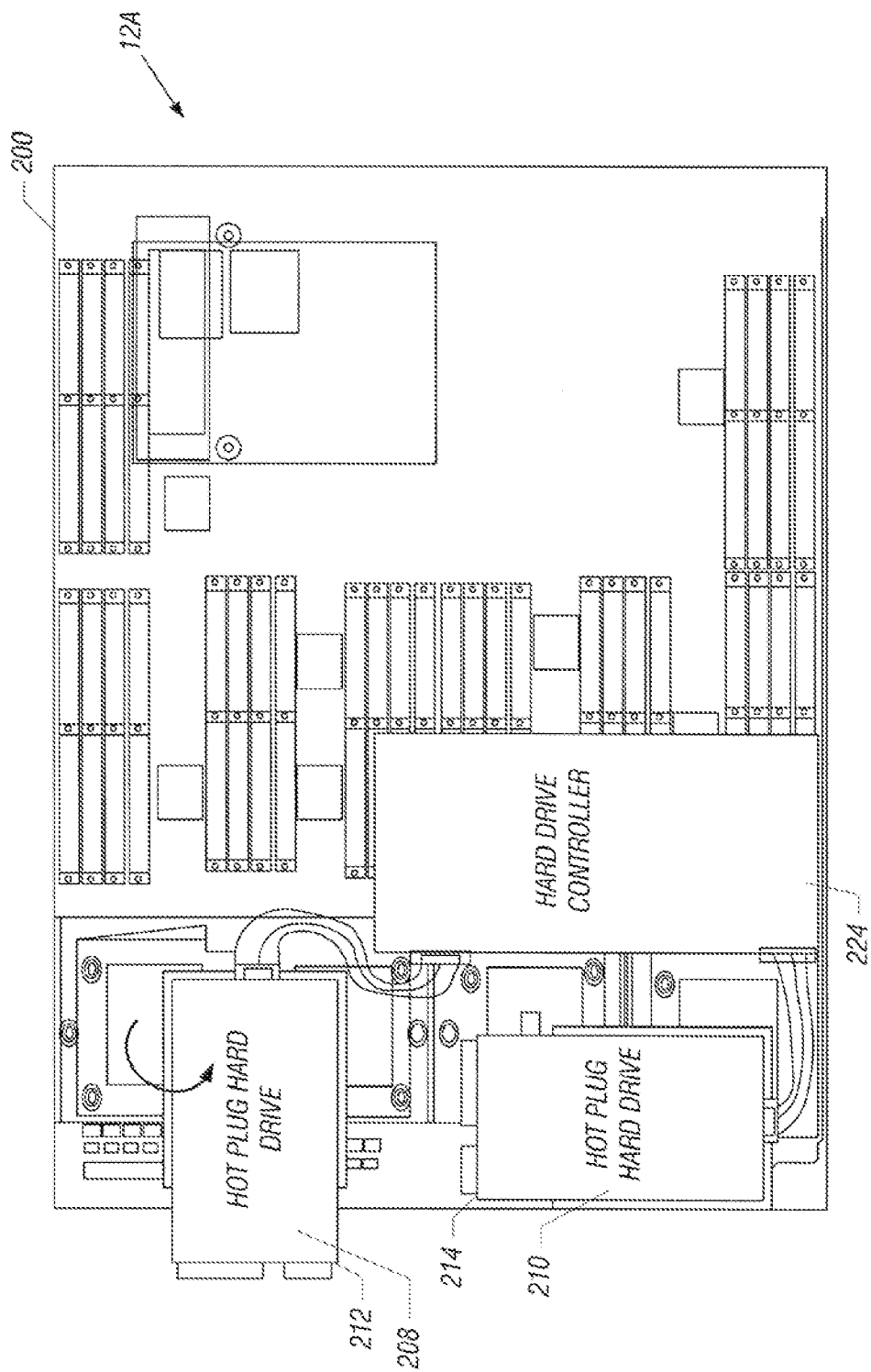
FIG. 34 is a top view of the blade server enclosure of FIG. 33 with one of the disk storage drives rotated to allow insertion or removal of the rotated disk storage drive.

FIGS. 2-32 depict a blade server with a smaller form factor. FIGS. 33 and 34 show a larger form factor blade server, which is twice the size of the blade server depicted in FIGS. 2-32. With the larger form factor blade server 12A of FIGS. 33 and 34, four processors 202A, 202B, 202C, and 202D are placed in the front portion 204 of the blade server 12A within the enclosure defined by housing 200. The four processors 202A-202D may be positioned in the front portion 204 for better cooling purposes. Other components are provided further inside the blade server 12A, including memory modules 206 and other components.

As shown in FIG. 33, a space above the processors 202A-202D is available for mounting hot-pluggable disk storage drives 208 and 210. Note, however, that the disk storage drives 208 and 210 cannot be mounted lengthwise into the housing 200 of the blade server 12A due to limited space inside the enclosure of the blade server 12A.

As shown in FIG. 33, the disk storage drives 208 and 210 are arranged in-line from one side of the blade server enclosure to the other side of the blade server enclosure. In the in-line arrangement of FIG. 33, the rear portion 216 of the disk storage drive 208 is provided adjacent the front portion 214 of the disk storage drive 210 (in other words, the disk storage drive 210 is behind the disk storage drive 208). As also depicted in FIG. 33, a connector 220 is provided at the rear portion 216 of the disk storage drive 208, and a connector 222 is provided at the rear portion 218 of the disk storage drive 210, where the connectors 220 and 222 are electrically connected by cables to a hard drive controller 224, also contained inside the blade server housing 200.

While the in-line arrangement of FIG. 33 goes from side to side in the blade server housing enclosure, the in-line arrangement of FIGS. 2-32 goes from front to back in the corresponding blade server housing enclosure. Since the in-line arrangement of FIG. 33 is side to side, the front portions 212 and 214 of the disk storage drives 208 and 210, respectively, are not accessible from the front of the blade server housing 200.

To enable access to the front of each disk storage drive 208 and 210, such that the disk storage drives 208 and 210 can be hot inserted and/or hot removed, each of the disk storage drives is rotatably mounted inside the blade server housing 200. As depicted in FIG. 34, the disk storage drive 208 has been rotated by 90° counterclockwise such that the front portion 212 of the disk storage drive 208 is accessible by a user. This allows the user to hot-remove the disk storage drive 208 from the blade server housing 200. The disk storage drive 210 is similarly rotatable to allow the front portion 214 of the disk storage drive 210 to be accessible at the front of the blade server housing 200.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom.

It is intended that the appended claims cover such modifications and variations as fall within the true spirit and scope of the invention.

What is claimed is:

1. An electronic device comprising:
a housing defining an enclosure;
one or more processors in the enclosure;
one or more memory modules in the enclosure;
disk storage drives provided in an in-line arrangement within the enclosure such that a rear portion of one disk storage drive is adjacent a front portion of another disk storage drive; and
a hinged drive tray slidable in a longitudinal direction of the hinged drive tray to move the hinged drive tray into and out of the enclosure, wherein the hinged drive tray has a first drive cage to carry a first of the disk storage drives, and a second drive cage to carry a second of the disk storage drives, and
wherein the hinged drive tray has a hinge mechanism to allow the first drive cage to pivot to a different elevation than the second drive cage to allow access of the second drive cage such that the second disk storage drive is insertable or removable from the second drive cage, and
wherein the first drive cage when pivoted to the different elevation remains generally parallel with the second drive cage.

2. The electronic device of claim 1, further comprising:
sockets attached in the enclosure,
wherein the disk storage drives are hot-pluggable to respective ones of the sockets, wherein the disk storage drives each has a connector at the rear portion of the disk storage drive to plug into a respective one of the sockets.

3. The electronic device of claim 2, further comprising backplane socket assemblies on which the corresponding sockets are mounted, wherein the backplane socket assemblies are attached to the hinged drive tray.

4. The electronic device of claim 3, further comprising a flexible cable connecting the backplane socket assemblies, wherein a segment of the flexible cable lies on a bottom surface of the hinged drive tray such that a first one of the disk storage drives is provided on the segment of the flexible cable when the first disk storage is mounted to the hinged drive tray.

5. An electronic device comprising:
a housing defining an enclosure;
one or more processors in the enclosure;
one or more memory modules in the enclosure; and
disk storage drives provided in an in-line arrangement within the enclosure such that a rear portion of one disk storage drive is adjacent a front portion of another disk storage drive; and
a hinged drive tray slidable in a longitudinal direction of the hinged drive tray to move the hinged drive tray into and out of the enclosure, wherein the hinged drive tray has a first drive cage to carry a first of the disk storage drives, and a second drive cage to carry a second of the disk storage drives, and
wherein the hinged drive tray has a hinge mechanism to allow the first drive cage to pivot to a different elevation than the second drive cage to allow access of the second drive cage such that the second disk storage drive is insertable or removable from the second drive cage, wherein the hinge mechanism has a left hinge assembly and a right hinge assembly, wherein the left hinge assembly has an inner hinge link attached to inner surfaces of the hinged drive tray, and an outer hinge link attached to outer surfaces of the hinged drive tray, and
wherein the right hinge assembly has an inner hinge link attached to inner surfaces of the hinged drive tray, and an outer hinge link attached to outer surfaces of the hinged drive tray.

6. An electronic device comprising:
a housing defining an enclosure;
one or more processors in the enclosure;
one or more memory modules in the enclosure; and
disk storage drives provided in an in-line arrangement within the enclosure such that a rear portion of one disk storage drive is adjacent a front portion of another disk storage drive; and
a hinged drive tray slidable in a longitudinal direction of the hinged drive tray to move the hinged drive tray into and out of the enclosure, wherein the hinged drive tray has a first drive cage to carry a first of the disk storage drives, and a second drive cage to carry a second of the disk storage drives, and
wherein the hinged drive tray has a hinge mechanism to allow the first drive cage to pivot to a different elevation than the second drive cage to allow access of the second drive cage such that the second disk storage drive is insertable or removable from the second drive cage, wherein the hinge mechanism has plural hinge links, wherein each of the hinge links has a first pivotable connection to a surface of the first drive cage and a second pivotable connection to a surface of the second drive cage.

7. The electronic device of claim 1, further comprising a motion control damper attached to the hinged drive tray to engage a corresponding profile in the enclosure to slow motion of the hinged drive tray as a user pulls or pushes the hinged drive tray.

8. The electronic device of claim 1, wherein the in-line arrangement of the disk storage devices extends between a front and back of the enclosure.

9. The electronic device of claim 1, wherein the in-line arrangement of the disk storage devices extends side to side in the enclosure, and wherein each of the disk storage devices are rotatably mounted in the enclosure such that each disk storage device is rotatable to cause a front of the disk storage device to be accessible from the front of the housing.

10. A system comprising:
a rack; and
a plurality of electronic devices mounted in slots of the rack, wherein each of the plurality of electronic devices comprises:
a housing defining an enclosure;
one or more processors in the enclosure;
one or more memory modules in the enclosure;
sockets in the enclosure; and
disk storage drives hot-pluggable to respective ones of the sockets, wherein the disk storage drives each has a connector at a rear portion of the disk storage drive to plug into a respective one of the sockets, and wherein the disk storage drives are mounted in an in-line arrangement within the enclosure such that the rear portion of one disk storage drive is adjacent a front portion of another disk storage drive; and
a hinged drive tray on which the disk storage devices are mounted, wherein the hinged drive tray has a first drive cage and a second drive cage that is pivotable to a different elevation with respect to the first drive cage, wherein a first of the disk storage drives is mounted in the first drive cage, and a second of the disk storage drives is mounted in the second drive cage, and wherein the first drive cage when pivoted to the different elevation remains generally parallel with the second drive cage.

11. A method of mounting disk storage drives in an enclosure of an electronic device, comprising:

slidably mounting a hinged drive tray in the enclosure, wherein the hinged drive tray has a first drive cage and a second drive cage, wherein the first and second drive cages are hingedly connected;

mounting the disk storage drives onto the first and second drive cages, wherein the disk storage drives have an in-line arrangement; and pivoting the first drive cage to a different elevation than the second drive cage such that the second drive cage is accessible to insert or remove the disk storage drive mounted on the second drive cage.

* * * * *